Oct. 4, 1927.
P. F. W. MULLER
1,644,482
PERFUME DISPENSER
Filed April 3, 1926
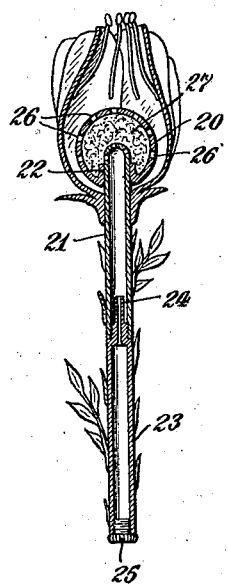
INVENTOR
Paul F. W. Muller
BY
ATTORNEY Patented Oct. 4, 1927.

1,644,482

UNITED STATES PATENT OFFICE.

PAUL FREDERICH WILLIAM MULLER, OF HOBOKEN, NEW JERSEY.

PERFUME DISPENSER.

Application filed April 3, 1926. Serial No. 99,449.

This invention relates to new and useful improvements in perfume-dispensers and has for its object to provide an article that possesses novelty, durability and an extreme elegance, suitable as a stationary ornament, or to be carried by a person for the sake of convenience and decorative purposes.

With the above and other objects in view, this invention consists of the novel features of construction, combination and arrangements of parts, hereinafter fully described, claimed, and illustrated in the accompanying drawings forming parts of this specification, and in which similar characters of reference indicate corresponding parts in all views, and in which Figure 1 is a front elevation of my invention; Fig. 2 is a transverse sectional view on line $b$—$b$ of Fig. 1, while Fig. 3 shows an article pertaining to my invention.

Referring more particularly to the drawings, 20 illustrates a glass bulb with an approximately hemispherical top, and being finely perforated as indicated by 26. This bulb is connected to a tube, or stem, 21 as shown at 22, by means of threading, or in any suitable way; said tube has a blind end portion at 22, which however is finely perforated to admit a fluid from the tube 21.

The tube 21 is connected to a lower tube member 23, as by threading, or in any suitable manner, and being formed to receive a defile 24, made on said lower tube member for the purpose of regulating the fluid, or perfume, when this is supplied to tube 23 by means of a drop filler, as shown in Fig. 6, the latter having its tapered end portion inserted into the tube 23 after unscrewing the stopper 25 from the bottom of same, when such act of filling is performed.

In the bulb 20 I place an absorbent material 27, to retain the perfume, which thereafter is distributed by means of the apertures 26.

To give this device an attractive appearance I construct or dress the same as a rose or flower, using said jointed tube and bulb as a skeleton and employing artificial material of suitable colors, as shown in Fig. 1. Said material may be fastened by means of athin wires or may be pasted on said structure.

It is obvious that changes may be made in the form, construction and arrangement of the several parts, as shown, within the scope of the appended claim, without departing from the spirit of the invention, and I do not therefore limit myself to the construction and arrangement shown and described herein.

What I claim as new, and desire to secure by Letters Patent of the United States, is:

An artificial flower having a skeleton, comprising a glass bulb with a perforated surface, and adapted to be screwed onto a tube, said tube having its upper end closed, with a perforated surface, a lower tube connected to said upper tube and having a narrowed projection inserted into same, a stopper inserted at the bottom of said lower tube, an absorbent substance to be placed in said glass bulb for retaining perfume when inserted in same through the lower tube, and suitable material attached to said skeleton to form an artificial flower, substantially as shown and described.

In witness whereof I have hereunto affixed my signature.

PAUL FREDERICH WILLIAM MULLER.